July 4, 1950 R. E. VON RUDEN 2,513,697
DRAGSAW ATTACHMENT FOR TRACTORS
Filed Aug. 18, 1945
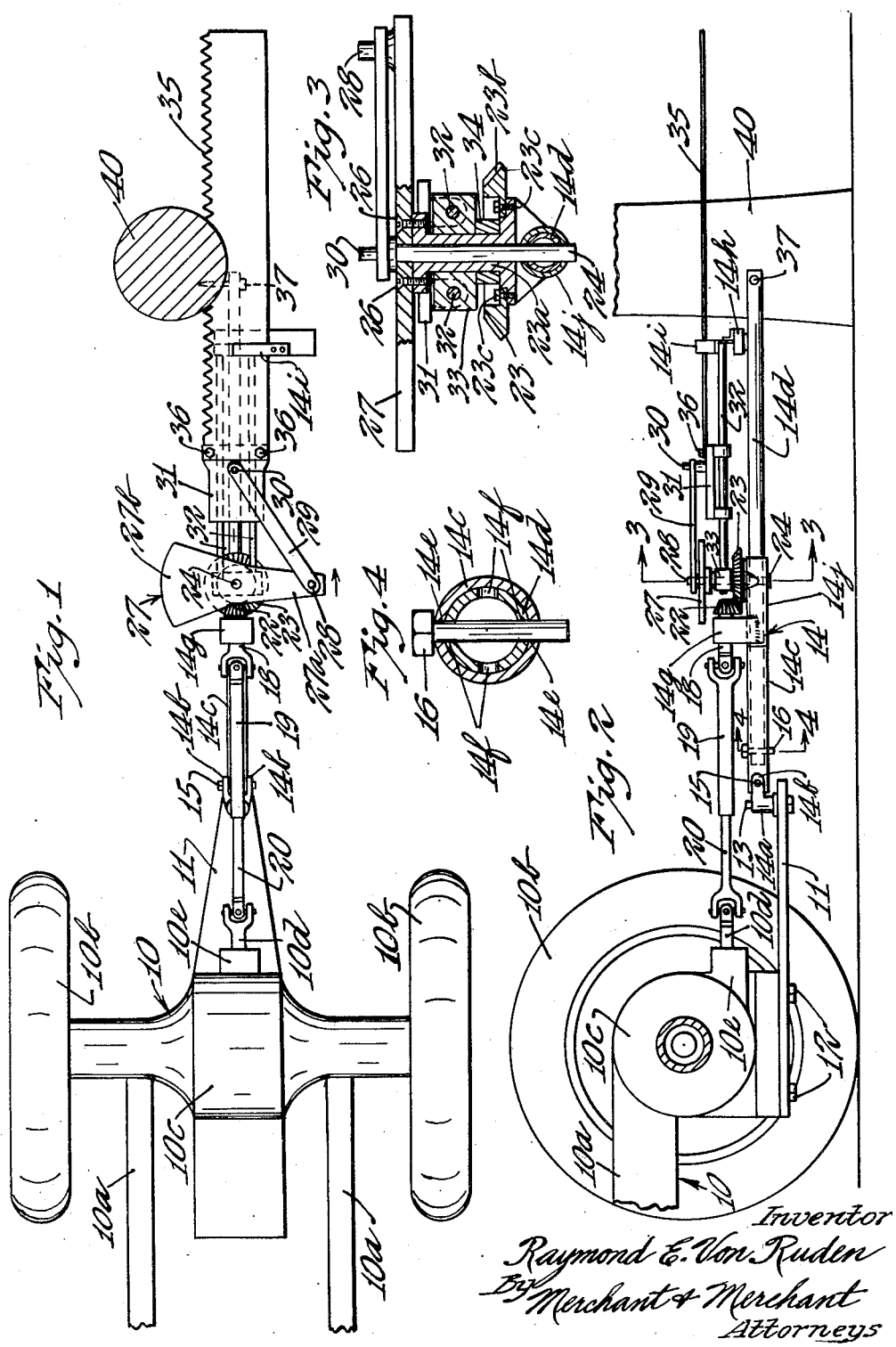
Inventor
Raymond E. Von Ruden
By Merchant & Merchant
Attorneys Patented July 4, 1950

2,513,697

UNITED STATES PATENT OFFICE 2,513,697

DRAGSAW ATTACHMENT FOR TRACTORS

Raymond E. Von Ruden, Claremont, Minn., assignor of fifty per cent to Norbert A. Von Ruden, Minneapolis, Minn.

Application August 18, 1945, Serial No. 611,327

1 Claim. (Cl. 143—68)

This invention relates to a saw structure, and while the invention might have various applications, it particularly is designed to comprise a saw driven from a rotating means carried on a stationary support such as a tractor frame. It is the common practice to have a saw driven from a rotating shaft mounted on an automobile or tractor. It is desirable to have a structure by means of which the saw can be moved freely to different positions and can be operated in either a horizontal or vertical direction.

It is an object of this invention therefore to provide a comparatively simple and efficient structure comprising a saw which can be moved to operate either in a horizontal plane or in a vertical plane.

It is another object of the invention to provide in combination with an automotive vehicle or tractor having a driving means, a stationary support secured to said tractor, a pivot member secured to said support, a frame swingable about said pivot member, a shaft journaled in said frame, a driving connection between said means and shaft, a saw carried by said frame, and a driving connection between said shaft and saw whereby said frame and saw can be moved to various positions and said saw operated either in a horizontal or vertical plane.

It is a further object of the invention to provide in combination with a stationary support having a rotating driving means carried thereby, a frame secured to said support and rotatable relatively thereto about axes extending at right angles to each other, a shaft journaled in said frame, a driving connection between said means and shaft, a reciprocating saw carried by said frame, and a driving connection between said shaft and saw whereby said frame and saw can be swung about a horizontal axis and about a vertical axis.

It is also an object of the invention to provide in combination with a stationary support having a driving means carried thereby, a frame connected to said support and rotatable about three axes at right angles to each other, a shaft journaled in said frame, a driving connection between said means and shaft, a saw carried by said frame, and a driving connection between said shaft and saw.

It is more specifically an object of the invention to provide in combination with a tractor having a rotating shaft, a stationary support secured to said tractor, a pivot member secured to said support extending substantially at right angles to the axis of said shaft, a frame swingable about said pivot member and adapted to extend generally in a direction substantially parallel to said shaft, a second shaft journaled in said frame, an extensible and contractable driving means between said shafts, the same preferably having universal joints connected to said shafts, a beveled gear secured to said second shaft, a second beveled gear meshing with said beveled gear, a crank secured to said second beveled gear, a pitman secured to said crank, a cross-head secured to said pitman and moving on a guide in said frame, a reciprocating saw secured to said cross-head, and means connected to said frame adapted to be connected to a tree or other object to be sawed.

These and other objects and advantages of the invention will be fully set forth in the following description made in connection with the accompanying drawings in which like reference characters refer to similar parts throughout the several views and in which:

Fig. 1 is a plan view of the device showing a portion of a tractor and showing an object to be sawed, the latter being in horizontal section;

Fig. 2 is a view in side elevation as seen from the bottom of Fig. 1;

Fig. 3 is a vertical section taken on line 3—3 of Fig. 2, as indicated by the arrows; and Fig. 4 is a vertical section taken on line 4—4 of Fig. 2, as indicated by the arrows.

Referring to the drawings, a portion of a tractor 10 is shown comprising a frame 10a, wheels 10b, transmission casing 10c, and a rotatable driving means or shaft 10d journaled in a suitable bearing 10e. A stationary support is provided and while this could take various forms, in the embodiment of the invention illustrated it is shown as a bar 11 secured to the tractor frame by spaced bolts 12. A pivot member 13 is provided and illustrated as a headed stud or bolt secured in support 11 adjacent the free end thereof. A member 14a surrounds and is rotatable on pivot 13, the same having spaced portions 14b between which extends another headed stud or pivot member 15. A portion 14c of a frame member 14 extends between portions 14b and is pivoted on member 15. It will thus be seen that frame 14 can swing about pivot member 13 which is shown as having a vertical axis, and can also swing about pivot member 15 shown as having a horizontal axis. The portion 14c swingable about pivot 15 is of cylindrical form and another cylindrical portion 14d of the frame, of reduced diameter, is surrounded thereby and telescopically mounted therein. The frame portion 14d can be rotated in portion 14c and held in a selected position thereon of two positions at right angles to each other by a headed pin 16 adapted to pass through alined holes 14e in portion 14c and through either of pairs of holes 14f formed in portion 14d, the pairs of holes 14f having their centers at right angles to each other. Frame 14 extends longitudinally, as shown in Figs. 1 and 2, in the direction substantially parallel with the axis of shaft 10d.

A short piece of reinforcing pipe 14j, the same diameter as 14c, is mounted fast on 14d and rotates therewith. A bearing 14g is carried by member 14j. A second shaft 18 is journaled in bearing 14g. Shaft 18 has connected to one end by a universal joint a member 19. Shaft 10d has secured to its end by a universal joint a member 20. While members 19 and 20 might be variously connected, in the embodiment of the invention illustrated, member 20 is formed of square or rectangular cross section and is slidable in an opening extending longitudinally of member 19, which opening is of similar cross section. Shaft 18 has secured to its other end a beveled pinion 22 which meshes with a beveled gear 23 rotatable on a stud 24 fixed in the frame portions 14j and 14d. As shown in Fig. 3, beveled gear 23 comprises a sleeve portion 23a having a peripheral flange which is rabbeted to receive the tooth portion 23b of said gear connected to portion 23a by circumferentially spaced bolts 23c. Portion 23a has a flange at its other end to which is secured by circumferentially spaced countersunk screws 26, a crank 27. Crank 27 comprises a connecting arm 27a and a counter-weighted oppositely extending portion 27b. A crank pin 28 is secured adjacent the outer end of arm 27a on which is pivoted a pitman 29, the other end of which is pivoted on a pin 30 secured to a crosshead 31. Cross-head 31 has a pair of downwardly extending lugs at each end thereof provided with bores through which pass the cross-head guide members 32. The cross-head guide members 32 are secured at one end in a block 33 surrounding the central portion of the gear sleeve 23a, said sleeve being journaled in said block. Sleeve 23a is also surrounded by a spacing collar 34 engaging the same and block 33. Members 32 are secured at their other ends to a frame portion 14h. A reciprocable saw or saw blade 35 is secured to cross-head 31 by spaced bolts 36, said saw moving through a guide member 14i secured to frame portion 14h. Adjacent to its outer end, frame member 14d is apertured to receive a nail or spike 37 adapted to be driven into the tree or log 40 or other object to be sawed.

In operation, when an object such as the tree 40 is to be sawed, the device will be located adjacent the same, as shown in Figs. 1 and 2, and frame member 14d will be secured to the tree by the spike 37. The tractor motor will now be operated to rotate the shaft 10d. This will, through the driving connection comprising members 19 and 20, rotate shaft 18. Shaft 18, through the gears 22 and 23, will rotate crank 27, and the cross-head 31 will be reciprocated by pitman 29 so that saw 35 will be reciprocated and the tree 40 will be sawed. The frame 14 and the saw can readily move about the axis of pivot member 13 for the purpose of initially locating the frame 14 and saw in proper operative position with respect to the tree or other work after the tractor has been placed in the approximately correct position. This ability to adjust the frame and saw about the axis of pivot 13 is very important in that it eliminates the otherwise difficult procedure of bringing these parts into the exact correct location by manipulation of the tractor itself. It will, of course, be appreciated that the saw, together with its cross head guide members 32, pivots about the axis of stud 24 to permit the saw to progress through the tree 40 or other work. The frame 14 can also be swung about the axis of pivot member 15 and the saw 35 can thus be moved to reciprocate in a vertical direction. When this is done the member 20 will move some distance into the member 19, and members 19 and 20 will extend at an angle to shafts 10d and 18. Shaft 18, however, will be effectively driven through the universal joints secured to said shafts. The saw 35 can thus be reciprocated in a vertical direction. Obviously it could be operated in any intermediate position. It may be desirable to change the plane of the saw 35 relatively to support 11 and this can be done by rotating the frame portion 14d in the portion 14c. As stated, these portions can be held in different positions at right angles to each other by the pin 16. Saw 35 could thus move in a vertical plane instead of a horizontal plane, as shown in Fig. 2, and still be reciprocated in a horizontal direction.

From the above descritpion it will be seen that I have provided a comparatively simple, compact and easily operable mechanism for operating a saw or drag saw from a tractor. The device can be easily and quickly placed in position, and as above described, the saw can be operated in various planes and in a vertical or horizontal direction. The saw blade can also be reciprocated vertically or horizontally and the plane of the blade disposed in planes at right angles to each other so that a vertical cut can be made to cut up a fallen log or a horizontal cut can be made to cut a standing tree. As above described, 14d of the frame is rotated in portion 14c, this being readily permitted by the beveled gears 22 and 23. The object to be sawed can thus be readily sawed in the desired plane. The parts are compactly arranged and efficiently located for the work to be done. When the device is not in use the saw and frame carrying the mechanism can be swung upward in position to be readily transported with the tractor. The device has been amply demonstrated in actual practice and found to be very successful and efficient.

A unique feature of the arrangement described is that the saw driving connections exert a torque twist on the saw and the cross-head guide members 32 which tends to rotate the same in a counterclockwise direction, with respect to Fig. 1, about the axis of the stud 24 and ring gear 23, thereby automatically maintaining the toothed edge of the saw in engagement with the work.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claim.

What is claimed is:

In a saw structure to be driven by a tractor, the combination of a stationary support secured to said tractor, a rotating driving shaft carried thereby, a pivot member having a substantially horizontal axis carried by said support, a frame swingable about said pivot member and adapted to occupy a position extending longitudinally of said shaft, a bearing carried on said frame, a second shaft journalled in said bearing and substantially aligned with said first-mentioned shaft when said frame is in said longitudinally extended position, an extensible and contractible torque transmitting means having universal joints at its ends connected to said shafts respectively, a reciprocating saw carried by said frame, a beveled pinion secured to said second shaft, a stud secured to said frame with its axis at right angles to the axis of the second shaft, a beveled gear journalled on said stud meshed with said beveled pinion, a crank secured to said beveled gear, a pitman connected to said crank, a cross-head connected to said pitman and to said reciprocating saw, a cross-head guide carried on said frame, and a perforation adjacent the free end of said frame adapted to receive a spike for securing the same to a log or other member to be sawed.

RAYMOND E. VON RUDEN.

REFERENCES CITED

The following references are of record in the file of this patent:

UNITED STATES PATENTS

| Number | Name | Date |
|---|---|---|
| 1,039,338 | Wallace | Sept. 24, 1912 |
| 1,367,480 | Jacy | Feb. 1, 1921 |
| 1,447,543 | Gessman | Mar. 6, 1923 |
| 1,489,387 | Fosberg | Apr. 8, 1924 |
| 1,589,481 | Obernuefemann | June 22, 1926 |
| 1,609,651 | McMillan | Dec. 7, 1926 |
| 1,710,749 | Svendsgaard | Apr. 20, 1929 |
| 1,778,321 | Hennig | Oct. 14, 1930 |
| 1,824,555 | Lathers | Sept. 22, 1931 |
| 2,354,095 | Adams | July 18, 1944 |